C. F. BROWN.
MACHINE FOR ATTACHING FASTENERS TO ENVELOPS.
APPLICATION FILED JULY 11, 1918.

1,324,874.

Patented Dec. 16, 1919.
12 SHEETS—SHEET 3.

Fig. 3.

WITNESSES:
Harry S. Gaither

INVENTOR
Claude F. Brown

BY
Chamberlin & Freudenreich
ATTORNEYS

C. F. BROWN.
MACHINE FOR ATTACHING FASTENERS TO ENVELOPS.
APPLICATION FILED JULY 11, 1918.

1,324,874.

Patented Dec. 16, 1919.
12 SHEETS—SHEET 4.

WITNESSES:

INVENTOR
Claude F. Brown,

BY
ATTORNEYS.

C. F. BROWN.
MACHINE FOR ATTACHING FASTENERS TO ENVELOPS.
APPLICATION FILED JULY 11, 1918.

1,324,874.

Patented Dec. 16, 1919.
12 SHEETS—SHEET 5.

C. F. BROWN.
MACHINE FOR ATTACHING FASTENERS TO ENVELOPS.
APPLICATION FILED JULY 11, 1918.

1,324,874.

Patented Dec. 16, 1919.
12 SHEETS—SHEET 6.

WITNESSES:

INVENTOR
Claude F. Brown

BY
ATTORNEYS

C. F. BROWN.
MACHINE FOR ATTACHING FASTENERS TO ENVELOPS.
APPLICATION FILED JULY 11, 1918.

1,324,874.

Patented Dec. 16, 1919.
12 SHEETS—SHEET 9.

WITNESSES:
Harry S. Gaither

INVENTOR
Claude F. Brown
BY
Chamberlin Brendenreich
ATTORNEYS

UNITED STATES PATENT OFFICE.

CLAUDE F. BROWN, OF CHICAGO, ILLINOIS, ASSIGNOR TO HECO ENVELOPE COMPANY, OF CHICAGO, ILLINOIS, A CORPORATION OF ILLINOIS.

MACHINE FOR ATTACHING FASTENERS TO ENVELOPS.

1,324,874.   Specification of Letters Patent.   Patented Dec. 16, 1919.

Application filed July 11, 1918. Serial No. 244,455.

*To all whom it may concern:*

Be it known that I, CLAUDE F. BROWN, a citizen of the United States, residing at Chicago, county of Cook, State of Illinois, have invented a certain new and useful Improvement in Machines for Attaching Fasteners to Envelops, and declare the following to be a full, clear, and exact description of the same, such as will enable others skilled in the art to which it pertains to make and use the same, reference being had to the accompanying drawings, which form a part of this specification.

My invention has for its main object to produce a simple and efficient machine for automatically forming and attaching to envelops metal clips or fastenings adapted to hold the flaps closed, and at the same time prepare and reinforce the flaps to coöperate with the fastening devices.

A further object of the present invention is to produce a simple and novel machine for forming metal clips or envelop-closing devices and effectively attaching them to envelops in such a manner that the stresses imposed on the devices when the envelops are in use are distributed over comparatively large areas, thus reducing to a minimum the danger of tearing the materials of which the envelops are made.

A further object of the present invention is to produce a simple and novel machine for fashioning out of simple strips of metal and paper or other suitable material envelop-closing and reinforcing devices and automatically attaching them to envelops.

While my invention as a whole relates to machines for providing envelops with closing attachments, many of the features of my invention may be used in other relations and therefore, viewed in one of its aspects, my invention may be said to have for its object to produce simple and novel mechanisms for carrying out various functions which will be brought out more fully in connection with the detailed description of my improved machine.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Fig. 7 is a section on a much larger scale than Fig. 6 taken on approximately the same plane as the latter and showing only those parts of the machine in the immediate vicinity of an envelop and its flap in the positions which they occupy just as the work on an envelop has been completed;

Fig. 8 is a perspective view of a fragment of an envelop after it has been operated on;

Fig. 11 is a side elevation of the mechanism for punching slits into a strip of paper, through which slits the arms of a clip are subsequently inserted;

In the machine illustrated there are fed into the machine two strips or ribbons of heavy paper gummed on one side and also a strip or ribbon of sheet metal. One of the strips of paper is cut up into wafers which are attached to the flaps of envelops, a hole being punched through each wafer and flap through which a clip attached to the body of the envelop may be passed; the wafers reinforcing that zone of the envelop flaps to which the stresses of the fastening devices are directly transmitted. The strip of sheet metal is cut up into U-shaped clips the arms of which are forced through previously located slits cut through the second strip or ribbon of paper; the arms of the clips being then bent laterally in opposite directions so as to lie flat against the paper; and the second strip of paper is then cut up into wafers each of which is provided with one of the clips, and these wafers are then attached to the body of the envelop in such position that when the arms of the clips are bent outwardly so as to bring them parallel with each other they may be passed through the reinforced openings in the flaps of the envelops. The clips are of course inserted through the paper strip from the gummed side so that when the wafers formed out of the strip are gummed to the envelop the connecting pieces between the arms of the clips lie between the wafers and the material of the envelops.

Figure 5:
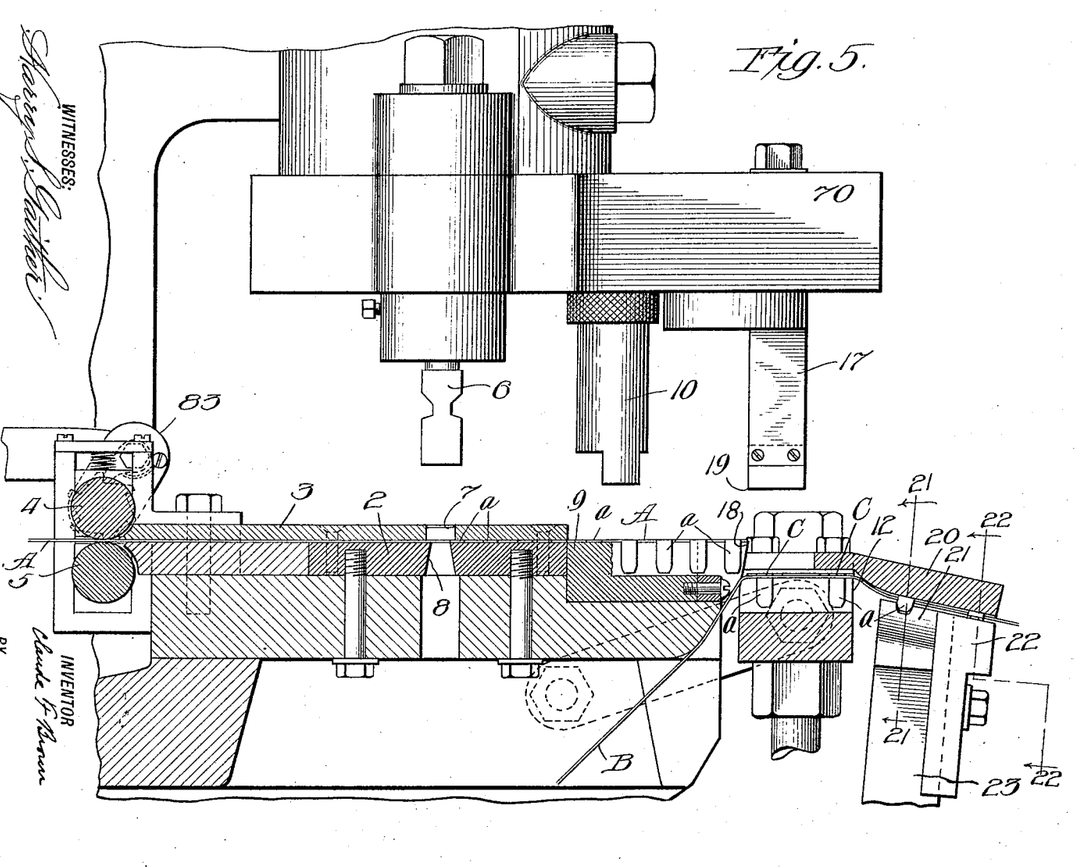
Fig. 5 is a section on a still larger scale taken approximately on line 5—5 of Fig. 4.

Referring now to the drawings, 1 represents a suitable frame of any desired size and shape. Suitably mounted on the frame is a small horizontal table, 2, above and parallel with which lies a cover plate, 3, (as best shown in Fig. 5) spaced apart from the table a distance only slightly greater than the thickness of the sheet metal of which a strip, as shown at A, is made. The sheet metal strip is fed across the table by means of co-acting feed rollers, 4 and 5, preferably knurled for the purpose of securing a positive feed, and rotatable step by step in proper time relation to the other mechanisms. Above the covered table is a vertically movable punch, 6. The cover for the table is provided with an opening, 7, in line with and sufficiently larger than the punch to permit the latter to travel up and down without meeting with interference from the cover. The table has therein an opening, 8, which lies directly beneath the punch and, at the top, has exactly the same outline as the cutting edges of the punch. The opening, 8, forms the female member of the clip-punching dies of which the member 6 forms the male member. The opening 8 is made flaring from the top toward the bottom so as to afford a clearance for the punch after it passes down below the plane of the top of the table.

Figures 14, 15, 16, 17, 18, 19:
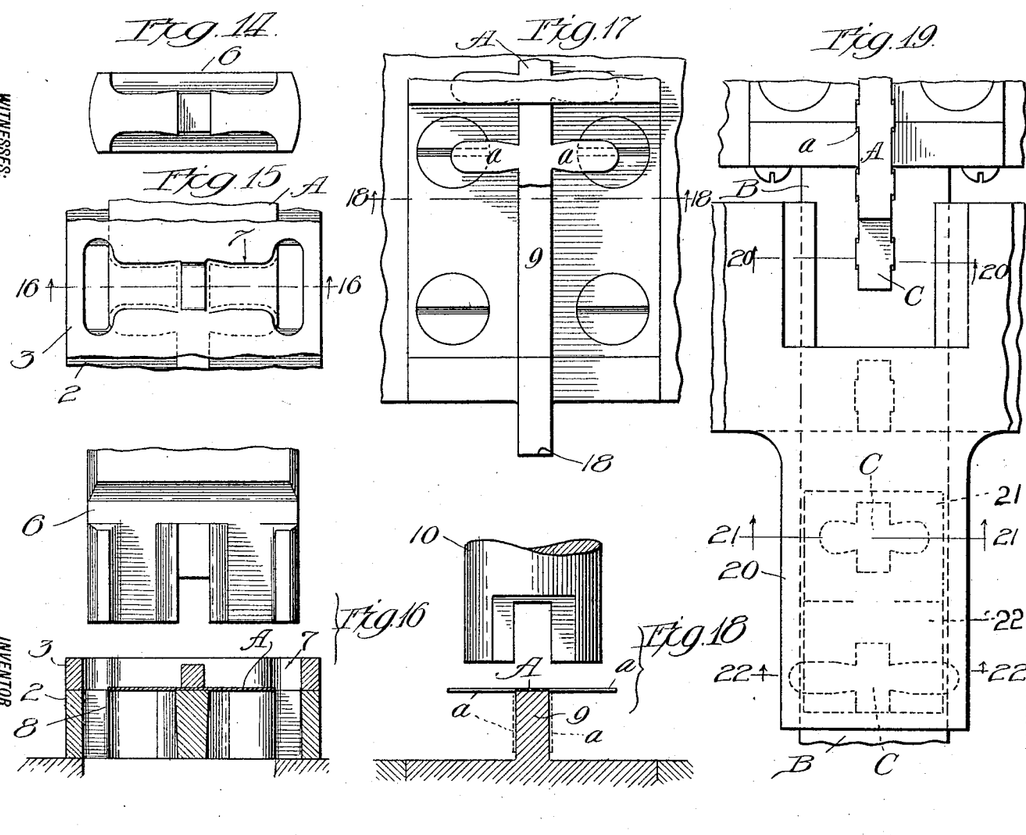
Fig. 15 is a top plan view of the stationary female member of the punching dies.
Fig. 16 is a vertical section taken approximately on line 16—16 of Fig. 15, together with the male die member shown in elevation.
Fig. 17 is a top plan view of the table of the machine immediately beyond the punching dies, along which the making of the clips is completed, a fragment of a strip containing a few connected clips being shown in position on the table.
Fig. 18 is a section taken approximately on line 18—18 of Fig. 17, showing the table in section and showing in elevation a coöperating plunger by means of which the clips are bent into U-shape, one of the clips being shown in full lines in the condition in which it reaches a point underneath the plunger and in dotted lines after it has been bent into the form of a U.
Fig. 19 is a top plan view of the table of the machine comprising the parts shown at the extreme lower end of Fig. 17, together with that part in which the clip is passed through slits in a strip of paper and is then flattened out again with the two arms lying on one side of the strip and the connecting piece between the arms lying on the other side.
Figure 20:
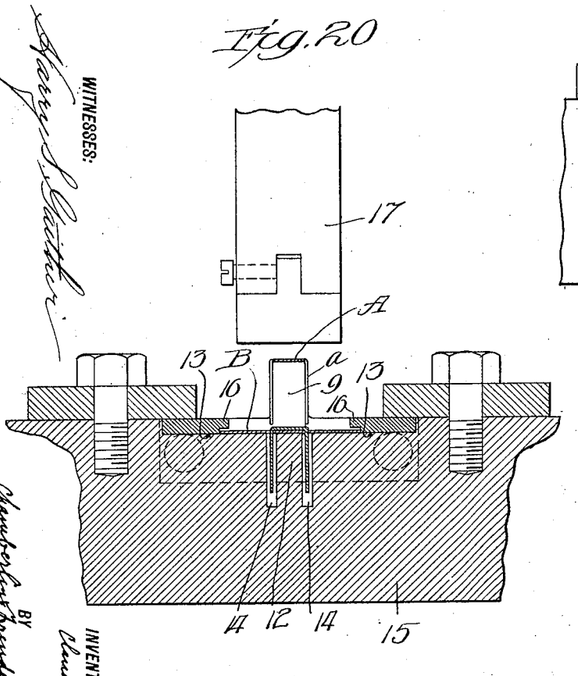
Fig. 20 is a section taken approximately on line 20—20 of Fig. 19 together with the movable shearing member and clip driver lying above the table.

The contour of the punching dies will of course depend upon the size and shape of the clip to be formed. It is preferable that the arms of the clips be comparatively narrow and therefore, in order to avoid undue narrowness in the yoke portion of the clip, that is the part connecting the arms together, I prefer to make the clips cross-shaped or, in other words, to widen the yoke portions of the clips and the punching dies illustrated are designed to form clips of this kind. The punching dies are best shown in Figs. 14 to 17. By referring to these figures it will be seen that the dies are arranged simply to punch out sections lying in alinement with each other on opposite sides of the metal strip so as to produce a ladder-like structure having a central stem and cross arms, $a$, the outer ends of the cross arms being rounded so as to present no sharp corners, and the inner ends where they join the stem, being narrowed somewhat, as best shown in Fig. 17.

Forming a continuation of the table 2, at the end opposite to the feed rolls, is a ledge, 9, having a width equal to the width of the stem member of the ladder-like metal strip. Above the member 9 is a vertically movable plunger, 10, having in its lower end a notch or recess, 11, slightly wider than the ledge. The plunger, 10, moves in synchronism with the punch 6 and is so spaced with respect thereto that whenever the punch descends the descending plunger finds beneath it one of the cross pieces of the ladder-like strip and consequently bends them down over the ledge as best shown in Figs. 5 and 18. In plan view the strip now appears as shown at the top of Fig. 19. The clip is now complete except that it has not yet been severed from the main strip of metal out of which it has been fashioned.

Figures 12, 13, 14:
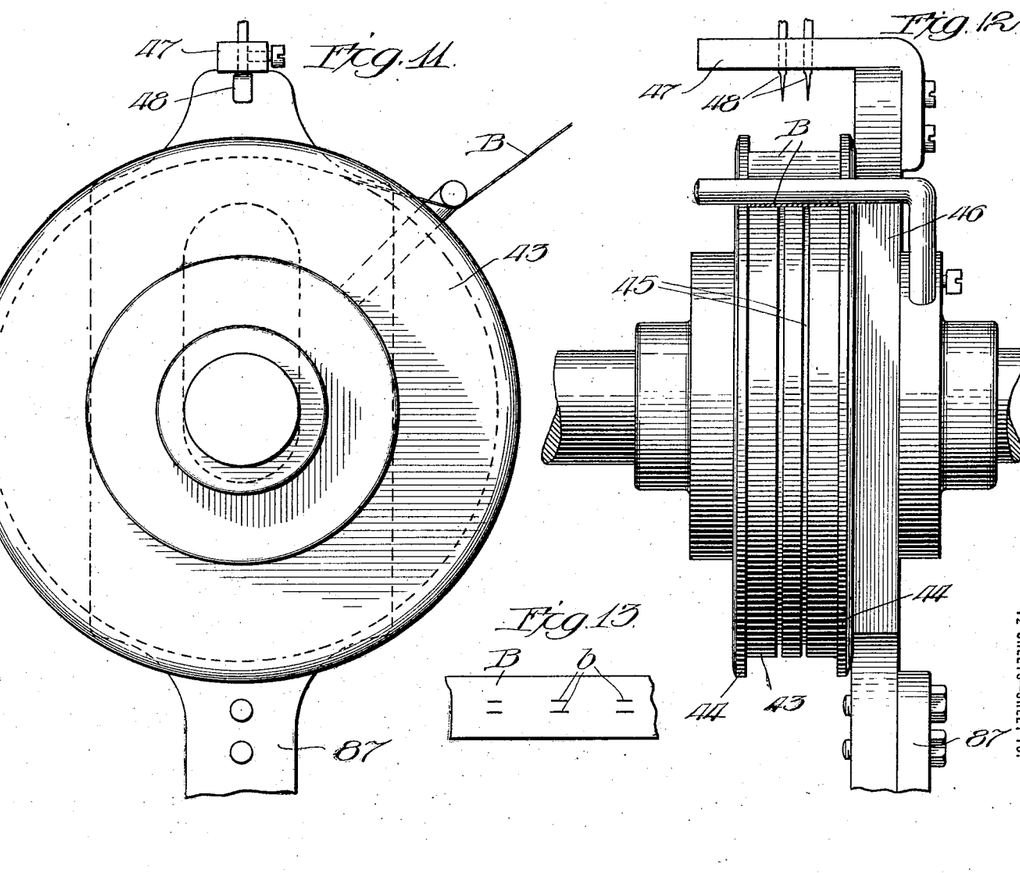
Fig. 12 is a front view of the parts shown in Fig. 11.
Fig. 13 is a plan view of a section of the paper strip after it has passed through the punching mechanism shown in Figs. 11 and 12.
Fig. 14 is a bottom plan view of the male member of the punching dies by which the metal clips are shaped.
Figure 21:
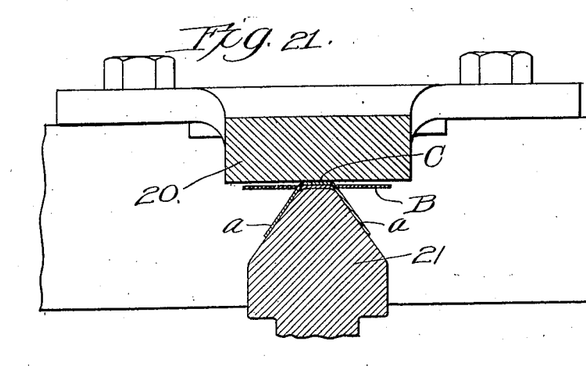
Fig. 21 is a section on an enlarged scale taken approximately on line 21—21 of Fig. 19 and also Fig. 5.
Figure 22:
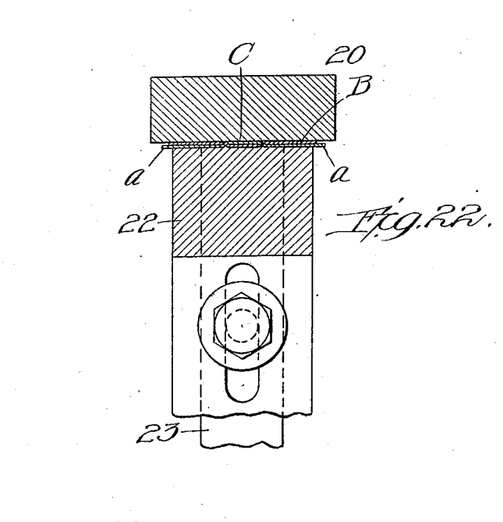
Fig. 22 is a section taken approximately on line 22—22 of Figs. 19 and 5.

Just beyond the ledge 9 is a second ledge, 12, the top of which is at a level considerably lower than the top of the ledge 9. At each side of and spaced apart from the ledge 12 is a flat surface, 13, lying in the same plane as the top of the ledge 12 but spaced apart therefrom. This arrangement may conveniently be produced by simply cutting parallel grooves, 14, into the top of a suitable stationary block, 15; the grooves, 14, being made deeper than the length of the arms *a* of the clips. Above the surfaces 13 are overhanging ledges, 16, spaced apart from each other a distance less than the width of the paper strip B out of which the clip attaching tabs are to be made and lying far enough above the surfaces 13 to permit the paper strip to be readily passed underneath the same across the ledge 12 and the surfaces 13. One of the paper strips, as indicated at B, is fed across the ledge 12 in the same direction as the metal strip is traveling; the paper strip, as will hereinafter be explained having been provided at intervals with pairs of parallel slits, *b*, cut through the same, as shown in Fig. 13. The slits *b* are preferably made at least as long as the width of the arms of the metal clips. The parts are so timed that whenever a clip comes to rest after passing beyond the end of the ledge, its arms lie directly above a pair of the slits in the paper strip *b*, the slits in turn lying above the grooves 14 at opposite sides of the ledge 12; the paper strip being moved intermittently so that it is at rest whenever the metal strip ceases its forward movement. There is located above the ledge 12 a vertically movable plunger, 17, adapted to move down past and in close proximity to the end of the ledge 9; the members 9 and 17 having co-operating shearing edges, 18 and 19, respectively whereby, as the member 17 descends, it shears off one complete clip C which has projected beyond the free end of the elevated ledge. The continued downward movement of the member 17 drives the arms of the clip through the corresponding slits in the strip B. Thus each clip remains attached to the strip out of which it is made until the proper point is reached and then the clip is attached to the strip of paper which thereafter carries it to its destination. Beyond the ledge 12 is an anvil or abutment, 20, underneath and in contact with which the strip B carrying the metal clips is fed. There is beneath the anvil or abutment a vertically movable hammer member provided with a head member, 21, in proximity to the point at which the strip enters beneath the anvil or abutment, this head being made wedge-shaped as best shown in Fig. 21, and provided also with a second head, 22, having a flat upper working face as best shown in Fig. 22; the distance from the center of the top of one head to the center of the top of the other being equal to the distance between consecutive clips connected to the paper strip. The double headed hammer, which I have indicated as a whole at 23, is reciprocated in proper time relation to the feed of the material and to the movements of the members 6, 10 and 17 so that whenever a clip has been carried beyond the ledge 12 it is first engaged by the wedge-shaped head 21, which enters between the arms of the clip and partially spreads them, as indicated in Fig. 21. The next forward movement of the clip brings it above the hammer head 22 which completes the spreading of the arms of the clip by flattening them out against the under side of the strip as shown in Fig. 22. Fig. 19 shows in dotted lines three consecutive clips that have already been attached to the strip of paper, the first of the three being just ready to pass from the ledge 12; the second having had its arms partially spread through the action of the hammer 21 and the third being in the final state ready to be attached to an envelop.

Figure 6:
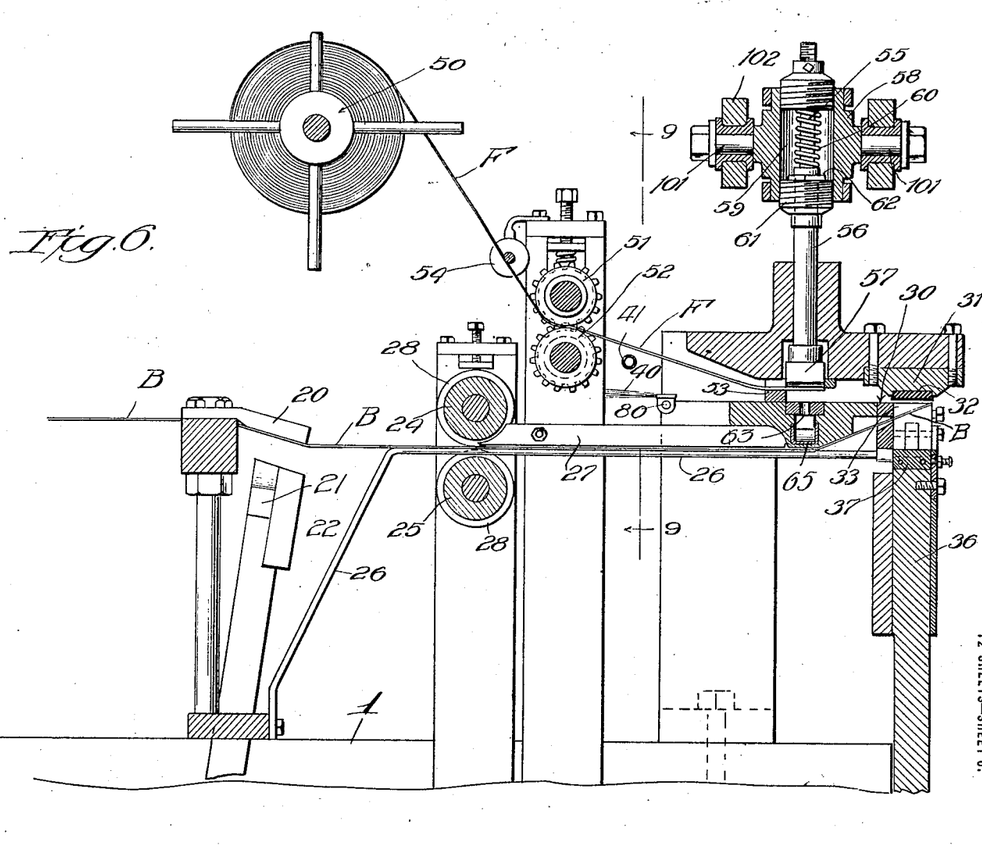
Fig. 6 is a vertical central section in the same plane as Fig. 5, through that portion of the machine beginning with the part shown on the extreme right hand end of Fig. 5.
Figures 7, 8:
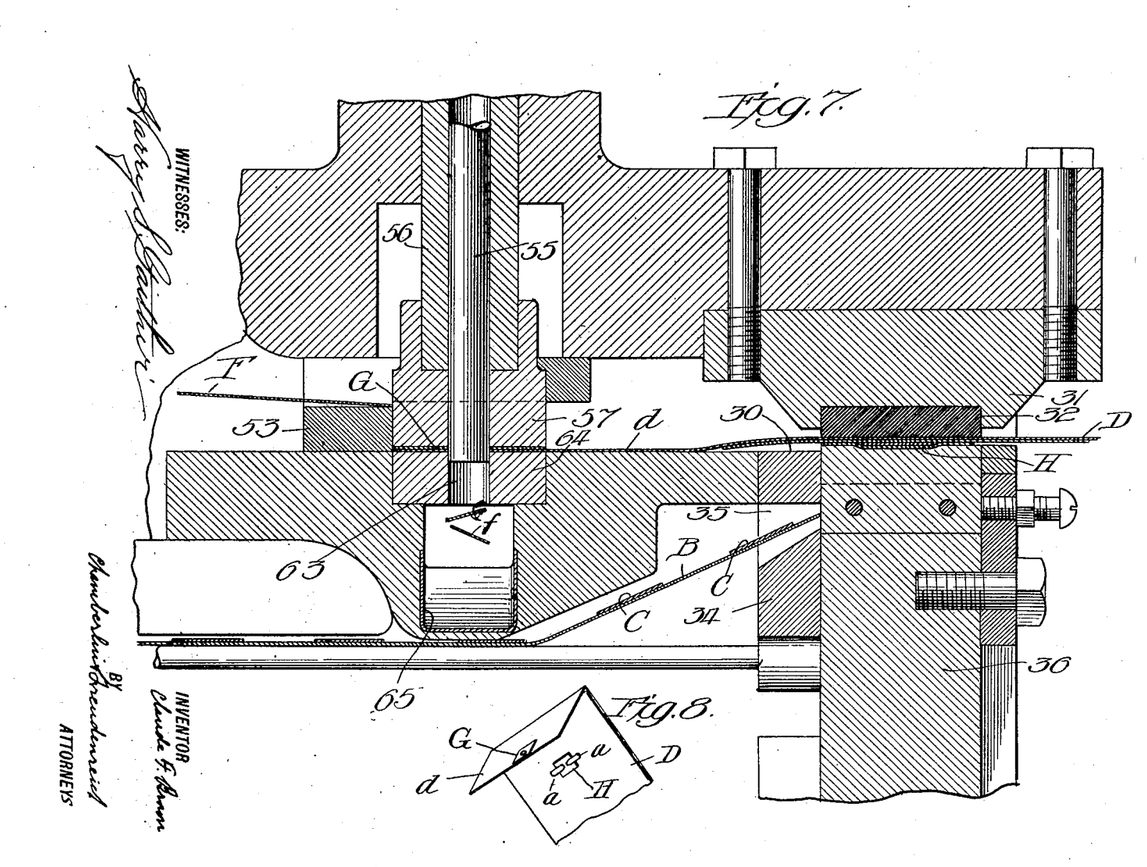
Figure 9:
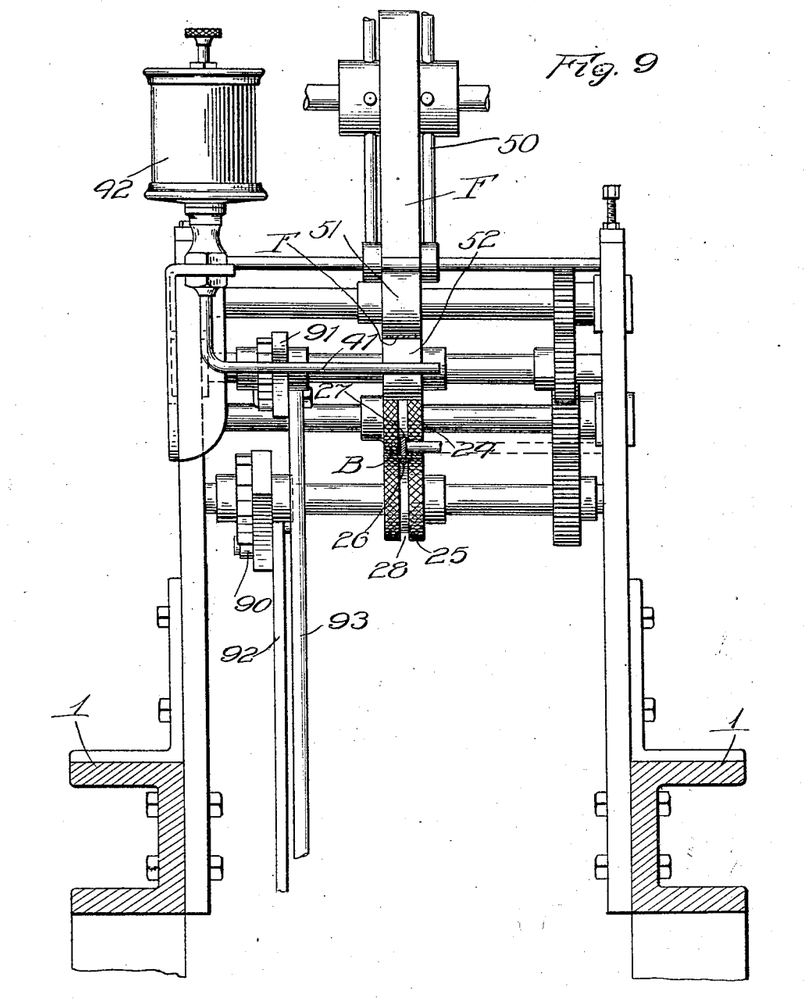
Fig. 9 is a section on an enlarged scale taken approximately on line 9—9 of Fig. 6.
Figure 10:
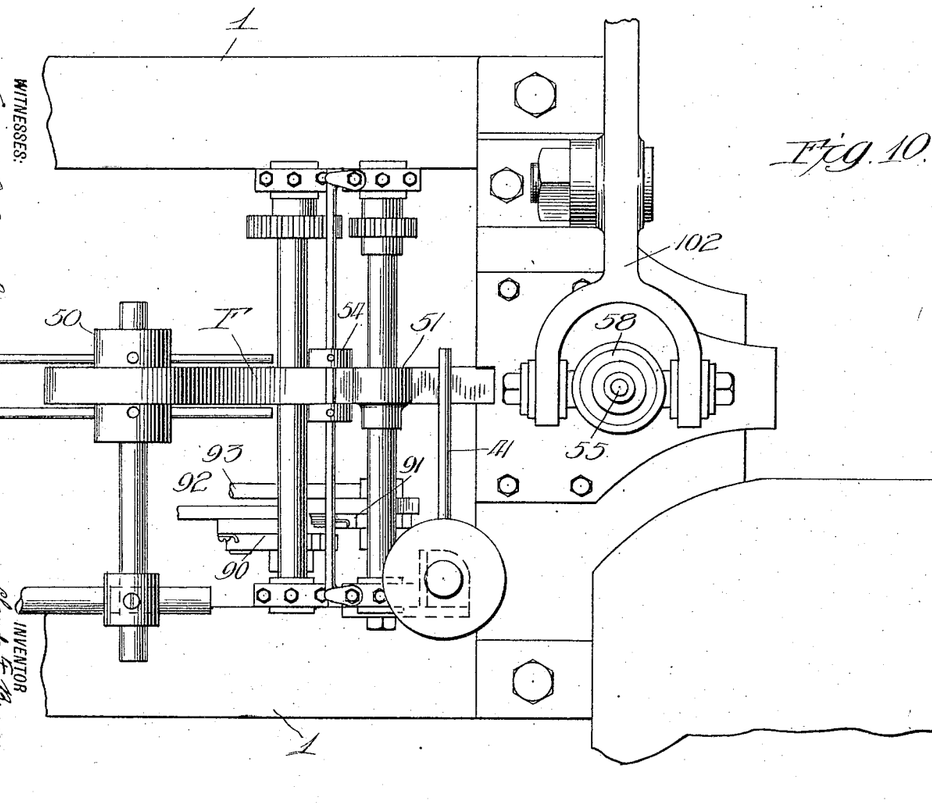
Fig. 10 is a top plan view of the parts shown in Fig. 6.

After the strip B with its clips passes from under the anvil or abutment, 20 it enters between a pair of feed rolls, 24 and 25, best shown in Figs. 6 and 9; these rolls being preferably knurled so as to insure a positive uniform feed. The feed rolls are driven step by step in proper time relation to the mechanism heretofore described so that they will carry the strip B forward in a proper manner. A guide in the form of a thin rod, 26, serves to support the strip from below, to direct it into the feed rolls and thereafter to support it until it reaches its destination. Beyond the feed rolls there may be a second guide, 27, in the form of a thin bar or plate set on edge above the center line of the strip; the member 27 preventing the strip from jumping up off the guide 26 but leaving substantially the entire upper surface of the strip exposed. The rollers 24 and 25 are provided with peripheral grooves, 28, for the passage of the guide rod, 26, and the reception of the advance end of the guide 27. Beyond the guides 26 and 27 is a table, 30, on which an envelop to be operated upon may be laid. Above the table is an anvil or abutment, 31 preferably having on the side directed toward the table a cushion, 32, as, for example, of rubber. The table is provided with an opening, 33, through the same having a width equal to the width of the strip B and a length equal to the distance between centers of the clips on the strip. The inner end of the opening 33 is bounded by a vertical plate, 34, through which is cut a slot, 35, through which the strip B is adapted to pass. A vertically movable plunger, 36, is mounted in position to travel up and down in contact with the plate 34 and toward and from the abutment or anvil 31. The upper part of the plunger is in the form of a block, 37, of hardened steel one edge of which coöperates with the upper edge of the wall bounding the slot 35 in the plate 34 to form a pair of shears by means of which a projecting end of the strip B may be cut off. The first part of the upward movement of the plunger cuts off the end of the strip, thus forming a tab or wafer, and the continued upward movement presses this tab or wafer against the under side of an envelop, D, lying on the envelop-supporting table; the tab and the envelop being pressed together between the plunger and the cushioned anvil or abutment as best shown in Fig. 7. It will be understood that the feeding of the strip and the operation of the plunger 36 are so timed and regulated that whenever the strip is moving the plunger is down so that the end of the strip may pass into the space above the plunger; the strip always coming to rest when a point midway between two of the clips thereon lies in the shearing plane, that is in the plane of the plate 34 along which the plunger travels; and the plunger making its upward movement during the time the strip is at rest.

The side of the strip B which is uppermost is coated with adhesive gum or cement which is in a plastic condition at the time the strip is cut into wafers and forced against the envelops that are being operated upon. Therefore, whenever a wafer is attached to an envelop the enlarged yoke portion of the clip carried thereby is sealed in place between the wafer and the body of the envelop while the arms of the clip flattened against the opposite side of the wafer remain exposed. In the arrangement shown, it is intended that one side of the strip be gummed before it is placed in the machine, the gum being moistened by means of a revolving brush, 40, as best shown in Fig. 6, which lies just above that portion of the strip traveling underneath the guide bar or plate 27; the brush being supplied with water in small quantities from a drip pipe, 41, connected to the outlet side of a suitable well, 42.

Figure 1:
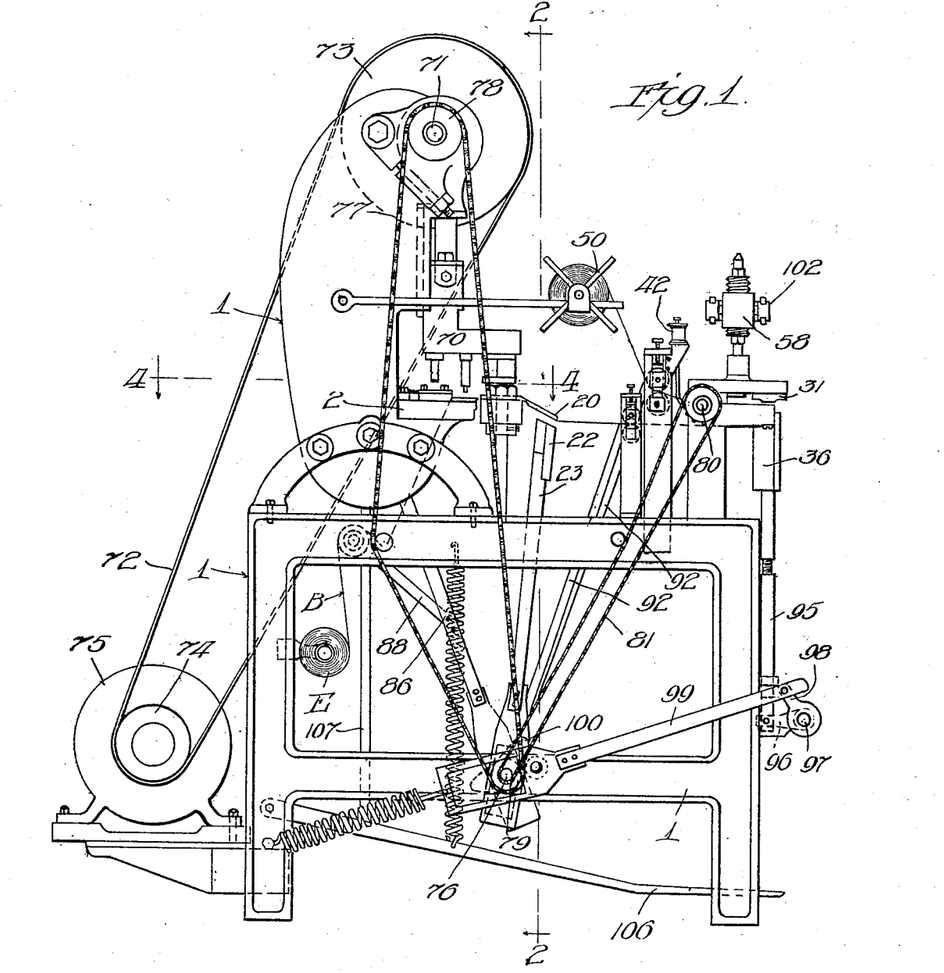
Figure 1 is a side view of a machine arranged in accordance with a preferred form of my invention.

The preliminary slitting of the strip B is accomplished as follows: The strip may conveniently be supplied in the form of a roll, E, suitably supported near the rear of the machine as best shown in Fig. 1. In traveling to the point at which it receives the clips, the strip passes over an idle wheel-like member, 43, (see Figs. 11 and 12), having peripheral flanges, 44, spaced apart a distance just equal to the width of the strip so as accurately to position the strip. The member 43 has a pair of parallel peripheral grooves, 45, extending circumferentially around the same, the distances between the centers of the grooves being equal to the distance between the arms of the clips when they are first fashioned into U-shaped members. Besides the member 43 is a reciprocable head, 46, having an arm, 47, which extends across the top of the member 43. Secured to the arm 47 are a pair of knives or blades, 48, which, when the head is reciprocated, cut through the paper where it overlies the slots 45; the slots permitting the blades to pass freely through the paper and thus form the slits shown at b in Fig. 13. The slitting head is operated in the same time relation to the feed of the strip as the other reciprocatory members heretofore described, so that, whenever the strip is moving, the slitting knives are kept out of the way while, whenever the strip comes to rest the knives pass through the same to form a set of slits for the subsequent reception of the arms of one of the clips.

In using the envelop the exposed arms of the clip are bent so as to give the clip its original U-shape, they are then passed through the folded down flap of the envelop and again flattened out. It is therefore advisable that the flap of the envelop be provided with a suitable perforation to receive the clip members and also that the flap be reinforced around the perforation in order that the material around the perforation shall not easily tear. To this end I have provided additional mechanism which I shall now describe. Referring to Fig. 6, it will be seen that there is a strip-holding reel, 50, revolubly supported on the machine somewhat above and in advance of the feed rolls for the strip B. A strip, F, similar to the strip B, is passed between feed rolls, 51 and 52, across the top of a transverse ledge, 53, projecting above the work-supporting table, 30, in advance of the anvil or abutment, 31. Before the strip reaches the feed rolls it is preferably passed through a suitable adjustable guide, 54, by means of which it may be accurately adjusted in the direction transverse to its travel. The strip F lies directly above the strip B so that by placing the gummed surface of the strip F on the under side, the gum will be moistened by the rotating brush while it is traveling between the feed rolls and the ledge 53. The ledge 53 serves as an abutment against which the free edge of the flap d of the envelop will be brought when the envelop is placed on the receiving table. The flap of the envelop is thus properly positioned to receive a tab or wafer that may be cut from the strip F by shearing the strip along the line where it passes from off the ledge and dropping it down onto the flap. Furthermore, the adhesive side of the tab or wafer being the under side, the tab or wafer need only be pressed firmly against the flap in order to make it adhere securely thereto. It is also desirable that a hole be punched through the tab or wafer and the flap of the envelop and this may conveniently be accomplished at the time that the tab or wafer is applied to the flap. In order that the shearing, pressing and punching operations may be effected positively and expeditiously, I have provided a two-part plunger which, as best shown in Figs. 6 and 7, comprises an inner member, 55, of a diameter equal to the diameter of the hole to be punched and a tubular member, 56, surrounding the inner member and having at the lower end a head or enlargement, 57, one edge of which is adapted to coöperate with one edge of the ledge 53 to shear sections from the strip or web. The upper end of the plunger member 55 is fixed in a vertically reciprocable head, 58. The head, 58, is provided with a chamber, 59, surrounding the member 55 and the upper end of the plunger member 56 terminates within the lower end of this chamber. A spring, 60, surrounds the plunger member 55 and bears at its upper end against the top wall of the chamber 59 and at its lower end against the top of the plunger member 56. The plunger member 56 is slidable up and down through the plug, 61, forming the bottom of the chamber 59 and a nut, 62, or other suitable stop device arranged on the upper end of the member 56 prevents the latter from dropping down out of the head. In the work-supporting table in alinement with the inner member of the plunger is a hole, 63, just large enough to permit the entrance of the plunger member; the hole 63 being preferably placed in a hard steel block, 64, so that the edges of the block surrounding the hole and the lower end of the plunger member 55 may act as the complementary members of a set of punching dies. Beneath the hole 63 is a suitable chute, 65, for carrying away material removed from the tabs or wafers and the envelop flaps by the punching die. The parts are so proportioned that when the two-part plunger is raised the inner member will not project below the outer member or at least will not project below the bottom of the latter far enough to interfere with the proper operation of the parts. The movements of the double plunger are timed to permit the removal and insertion of an envelop and the feeding of the strip F far enough to bring a piece of the desired length beyond the ledge 53 while the plunger is up out of the way. Then, when the feeding of the strip stops, that is when all three of the strips are at rest, the plunger descends; the first action of the plunger being to shear off a tab or wafer, G, and to press it down upon the underlying envelop flap. Then, as the supporting head for the plunger continues to descend, the spring above the upper end of the outer plunger member is compressed, placing the wafer or tab under great pressure, and the punch member of the plunger passes down through the tab and flap, cutting out a small section, f, which is discarded through the chute 65.

It will be seen that the wafer or tab, G, is placed on the top side of the envelop while the clip-bearing tab, H, is placed on the bottom side of the envelop as the latter lies in the machine. When the envelop is removed from the machine, the flap being partially folded down, it has the appearance shown in Fig. 8.

Figure 2:
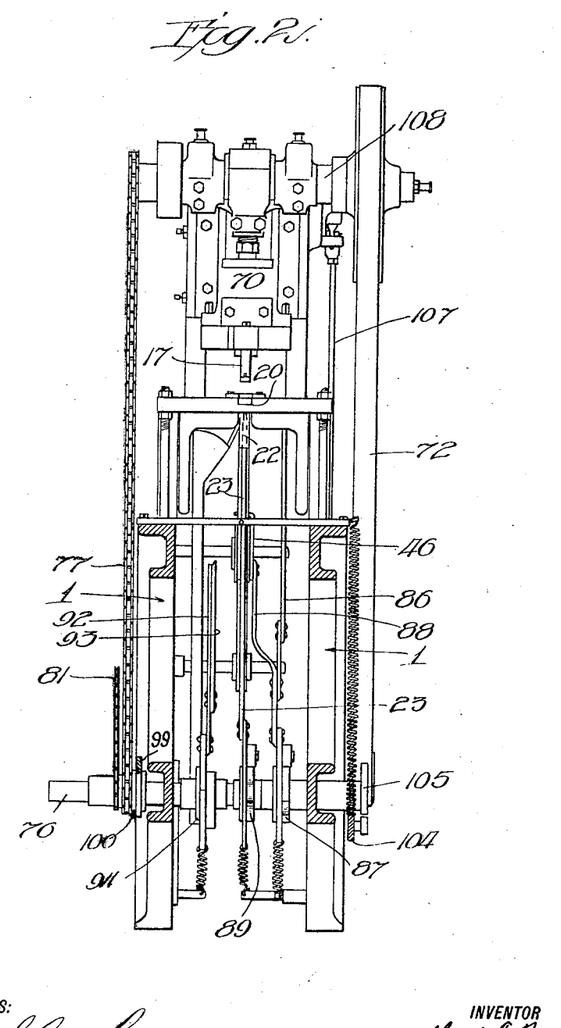
Fig. 2 is a section taken approximately on line 2—2 of Fig. 1.
Figure 3:
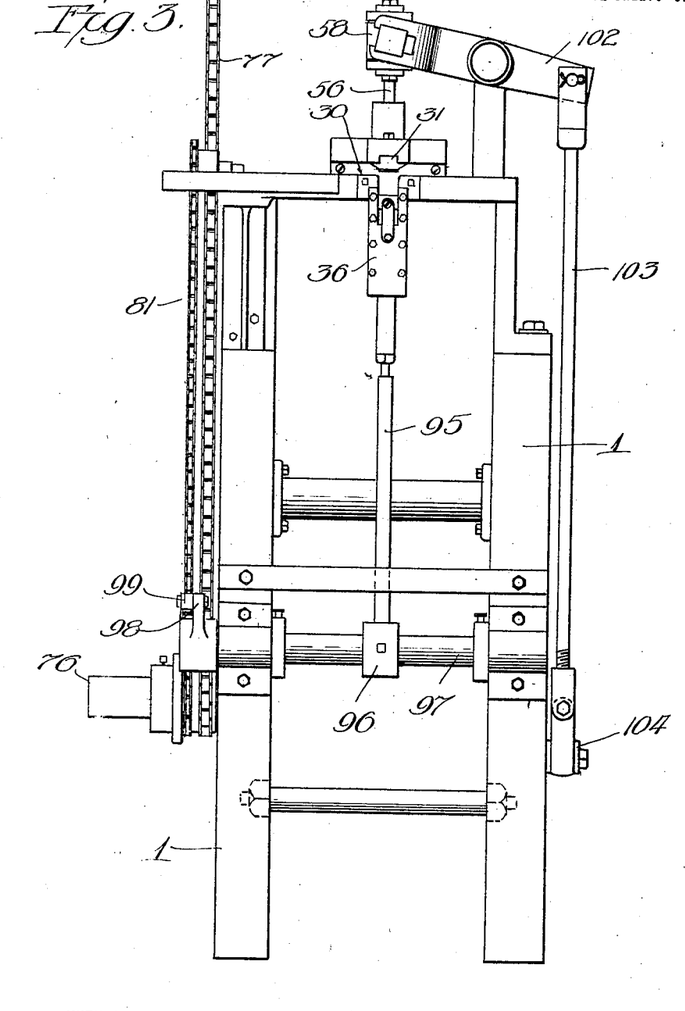
Fig. 3 is a front view of the machine, on a larger scale, that is a view looking at the right hand end of the machine as shown in Fig. 1, the upper part of the machine being omitted.
Figure 4:
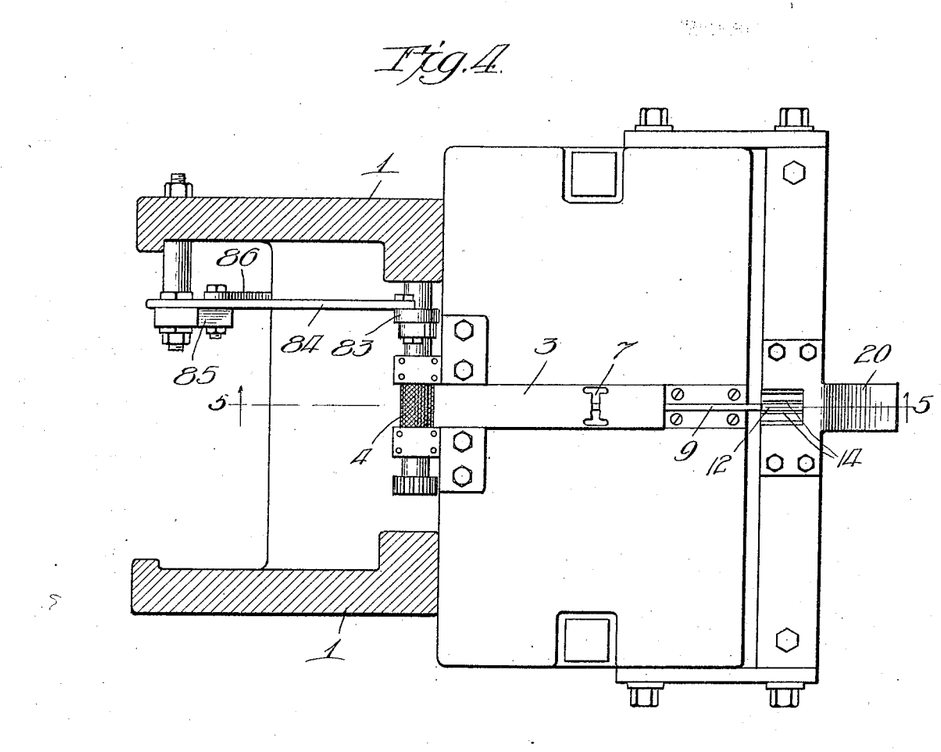
Fig. 4 is a section on an enlarged scale taken approximately on line 4—4 of Fig. 1.

The details of the construction by which the various movable parts are supported and actuated are of no special importance since such details are largely a matter of choice. In the arrangement shown, the three reciprocable members, 6, 10 and 17, which act in succession on the metal strip to produce the clips are all rigidly mounted in a single head, 70, actuated in precisely the same manner as the movable member of an ordinary punch press from an elevated transverse shaft, 71. The shaft 71 is driven by means of a belt, 72, passing over pulleys, 73 and 74, located respectively on the shaft 71 and on the shaft of a motor, 75. All of the other movable parts are actuated from a rotatable countershaft, 76, revolubly supported in the frame of the machine near the floor. The shaft 76 is driven by means of a sprocket chain, 77, passing over sprocket wheels, 78 and 79, located respectively on the shaft 71 and the shaft 76. The shaft 80, on which the rotary brush is mounted, is driven by means of a sprocket chain, 81, which is in turn driven by the shaft 76. The feed rolls 4 and 5, as best shown in Figs. 4 and 5, are operated by a pawl and ratchet device, 83, operated by a connecting rod, 84, which is in turn connected at one end to a bell crank lever, 85. The bell crank lever is actuated by means of a rod or bar, 86, (see Figs. 1 and 2) extending down to the shaft 76 where it is engaged by a suitable cam, 87, (see Fig. 2). The slit punching device shown in Figs. 11 and 12 may conveniently be operated by means of an arm or bar, 88, rigidly connected to or forming part of the member 86 so as to be movable in unison therewith. The shank, 23, of the double headed hammer by means of which the clips are flattened after having been passed through the attaching strip also extends down into proximity to the shaft 76 and is driven from a suitable cam, 89, (see Fig. 2) on this shaft. The two sets of feed rolls, 24, 25 and 51, 52, are moved step by step by suitable pawl and ratchet devices, 90 and 91, respectively, these being in turn actuated by means of rods, 92 and 93, which may be connected together as indicated in Fig. 2 so as to be actuated by means of a common cam, 94, on the shaft 76. The plunger 36 is carried on the upper end of a stem, 95, whose lower end is operatively connected to an arm, 96, projecting from a transverse rock shaft, 97, suitably supported on the front side of the frame of the machine. The rock shaft has a second arm, 98, which is operatively connected to one end of an actuating rod or bar, 99, extending into proximity to the cam shaft 76 so as to be reciprocated by means of a suitable cam, 100. As the rod 99 is reciprocated it rocks the shaft 97 and reciprocates the plunger carried by the member 95. The head 58 carrying the double plunger by means of which the tab is attached to the envelop flap and perforated has at opposite sides thereof alined trunnions, 101, which extend through jaws or bearings in one end of the forked lever, 102, pivotally supported between its ends and having at its other end a depending actuating rod, 103, which is actuated by means of a lever, 104, which at its rear end is engaged by a cam, 105, on the cam shaft. As the cam shaft revolves the lever 104 is oscillated, reciprocating the connecting rod, 103, and oscillating the forked actuating lever 102 so as to cause the double plunger to move up and down. The starting and stopping of the machine may be controlled by means of a foot lever, 106, from which extends a rod, 107, to a clutch, 108, between the driving pulley 73 and the main shaft 71.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In a machine of the character described, means for forming a clip and a wafer, and means for securing the wafer to an article with a part of the clip lying between the wafer and the article.

2. In a machine of the character described, means for securing a clip to a wafer member in such a manner that portions of the clip lie on opposite sides of the wafer member, and means for attaching the wafer member to an article in such a manner as to hold against the article that portion of the clip lying on one side of the wafer member.

3. In a machine of the character described, means for forming a wafer attached to a clip having a portion lying flat against one side of the wafer and a part extending to the opposite side of the wafer, and means for pasting the wafer to an article with the first mentioned side of the wafer in contact with said article.

4. In a machine of the character described, means for feeding a strip, means for attaching clips at intervals along the strip, and means for severing pieces from the strip along lines between consecutive clips and attaching said pieces to envelops or other articles.

5. In a machine of the character described, means for feeding a strip, means for attaching clips at intervals along the strip in such a manner that a portion of each clip lies flat against one side of the strip and another portion extends to the other side of the strip, and means for severing the strip into pieces along lines between consecutive clips and attaching the pieces to envelops or other articles with those portions of the clips that lie flat against the strip as aforesaid located between the pieces and said articles.

6. In a machine of the character described, means for acting on a clip having a flat part and an arm extending therefrom to force said arm through a wafer member and bring the flat part parallel and in contact with one side of the wafer member, and means for pasting or cementing the aforesaid side of said wafer member against an envelop or other article.

7. In a machine of the character described, means for forming a U-shaped clip and driving the arms thereof through a wafer member, and means for pasting or cementing said wafer member to an envelop or other article with the yoke portion of the clip lying between the wafer member and said article.

8. In a machine of the character described, means for driving the arms of a U-shaped clip through a wafer member, means for spreading the arms of the clips so as to make them lie flat against the wafer member, and means for pasting or cementing the wafer member to an envelope or other article so as to leave the flattened arms exposed.

9. In a machine of the character described, mechanism for forming a strip of sheet metal progressively into U-shaped clips, means for driving the arms of the clips through an attaching strip, and means for cutting said attaching strip into pieces each containing a clip and securing said pieces to an envelop or other article with the arms of the clips left exposed on the outer sides of the pieces.

10. In a machine of the character described, mechanism for forming a metal strip into a series of connected U-shaped clips, mechanism for cutting off individual clips and forcing the arms thereof through an attaching strip, and mechanism for spreading apart the arms of the clips so as to cause them to lie flat against the attaching strip.

11. In a machine of the character described, mechanism for acting on a metal strip to form it into a series of connected clips, mechanism for cutting off individual clips and forcing parts thereof through an attaching strip, mechanism for flattening the clips after they have been inserted in the attaching strip so as to make them lie flat against the strip, and means for feeding said metal strip and said attaching strip step by step in unison with each other but at different rates of travel.

12. In a machine of the character described, a support for an envelop and its flap, mechanism operatively associated with said support in position to press a reinforcing wafer upon the flap of an envelop and perforate the wafer and the flap, mechanism operatively associated with said support for pressing a wafer against the body of the envelop in position to underlie the aforesaid wafer when the envelop flap is folded down, means for feeding to said mechanisms two strips one of which contains clips distributed at intervals along the same and each gummed on the side adapted to engage the envelop, means for moistening the gummed surfaces of the strips, and means associated with said mechanisms for cutting pieces from the ends of said strips to form the aforesaid wafers.

13. In a machine of the character described, means for feeding a strip, means for slitting the strip at intervals, and means for attaching clips to the strip by driving them through the slits therein.

In testimony whereof, I sign this specification.

CLAUDE F. BROWN.